(12) United States Patent
Harada et al.

(10) Patent No.: US 9,919,962 B2
(45) Date of Patent: Mar. 20, 2018

(54) POLISHING AGENT FOR SYNTHETIC QUARTZ GLASS SUBSTRATE

(71) Applicant: Shin-Etsu Chemical Co., Ltd., Tokyo (JP)

(72) Inventors: Daijitsu Harada, Joetsu (JP); Masaki Takeuchi, Joetsu (JP); Yukio Shibano, Joetsu (JP); Shuhei Ueda, Joetsu (JP); Atsushi Watabe, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/511,065

(22) Filed: Oct. 9, 2014

(65) Prior Publication Data

US 2015/0021292 A1  Jan. 22, 2015

Related U.S. Application Data

(62) Division of application No. 12/678,058, filed as application No. PCT/JP2009/059676 on May 27, 2009, now abandoned.

(30) Foreign Application Priority Data

Jun. 11, 2008 (JP) ................. 2008-152899
Jun. 11, 2008 (JP) ................. 2008-152924
Jun. 11, 2008 (JP) ................. 2008-152940
Jun. 11, 2008 (JP) ................. 2008-152964

(51) Int. Cl.
| | |
|---|---|
| C03C 19/00 | (2006.01) |
| B24B 1/00 | (2006.01) |
| B24B 37/005 | (2012.01) |
| C09G 1/04 | (2006.01) |
| C09K 3/14 | (2006.01) |
| C09K 13/06 | (2006.01) |
| B24B 37/00 | (2012.01) |
| C09G 1/02 | (2006.01) |
| C03C 15/02 | (2006.01) |
| C09K 13/02 | (2006.01) |

(52) U.S. Cl.
CPC .............. C03C 19/00 (2013.01); B24B 1/00 (2013.01); B24B 37/00 (2013.01); B24B 37/0056 (2013.01); C03C 15/02 (2013.01); C09G 1/02 (2013.01); C09G 1/04 (2013.01); C09K 3/1454 (2013.01); C09K 3/1463 (2013.01); C09K 13/02 (2013.01); C09K 13/06 (2013.01)

(58) Field of Classification Search
CPC ....... B24B 1/00; B24B 37/0056; C03C 19/00; C03C 15/02; C09G 1/02; C09G 1/04; C09K 3/1463; C09K 13/06; C09K 3/1454
See application file for complete search history.

(56) References Cited

U.S. PATENT DOCUMENTS

| | | | |
|---|---|---|---|
| 4,889,998 A | 12/1989 | Hayano et al. | |
| 4,999,510 A | 3/1991 | Hayano et al. | |
| 5,352,277 A | 10/1994 | Sasaki | |
| 6,149,696 A | 11/2000 | Jia | |
| 6,171,352 B1* | 1/2001 | Lee ..................... | C09G 1/02 257/E21.304 |
| 6,719,819 B2 | 4/2004 | Ota et al. | |
| 6,872,329 B2 | 3/2005 | Wang et al. | |
| 7,037,352 B2 | 5/2006 | Ito et al. | |
| 7,071,105 B2 | 7/2006 | Carter et al. | |
| 2001/0003672 A1 | 6/2001 | Inoue et al. | |
| 2002/0039875 A1* | 4/2002 | Kobayashi et al. ............ | 451/36 |
| 2003/0036340 A1* | 2/2003 | Moriya et al. ................. | 451/41 |
| 2004/0083656 A1 | 5/2004 | Hagihara et al. | |
| 2004/0144755 A1* | 7/2004 | Motonari et al. ............... | 216/88 |
| 2005/0079803 A1 | 4/2005 | Siddiqui et al. | |
| 2006/0196848 A1 | 9/2006 | Carter et al. | |
| 2007/0145014 A1 | 6/2007 | Nishimoto et al. | |
| 2008/0003829 A1* | 1/2008 | Shin et al. .................... | 438/692 |
| 2008/0076327 A1 | 3/2008 | Yamaguchi et al. | |
| 2008/0096385 A1 | 4/2008 | Kim et al. | |
| 2008/0115533 A1 | 5/2008 | Otsuka et al. | |
| 2008/0220610 A1 | 9/2008 | Bayer et al. | |
| 2008/0237535 A1* | 10/2008 | Maejima .................. | C09G 1/02 252/79.1 |
| 2009/0011681 A1 | 1/2009 | Koike et al. | |
| 2009/0176372 A1* | 7/2009 | Minamihaba ............ | C09G 1/02 438/693 |
| 2009/0221213 A1 | 9/2009 | Namie et al. | |
| 2009/0283715 A1 | 11/2009 | Nobe et al. | |

FOREIGN PATENT DOCUMENTS

| | | |
|---|---|---|
| EP | 1 219 568 A2 | 7/2002 |
| GB | 2 403 954 A | 1/2005 |
| GB | 2 433 516 A | 6/2007 |

(Continued)

OTHER PUBLICATIONS

Compol 80 data sheet from the manufacture Fujimi, from http://www.fujimiinc.co.jp/products/pdf/08_COMPOL-FZ-CLEALITE.pdf. Printed from the web site on May 17, 2012.

(Continued)

Primary Examiner — Jiong-Ping Lu

(74) Attorney, Agent, or Firm — Birch, Stewart, Kolasch & Birch, LLP

(57) ABSTRACT

Disclosed is a polishing agent for synthetic quartz glass substrates, which is characterized by containing a colloidal solution of a colloidal silica or the like having a colloid concentration of 20-50% by mass, and a polycarboxylic acid polymer, an acidic amino acid, a phenol or a glycosaminoglycan.

11 Claims, No Drawings

(56) References Cited

FOREIGN PATENT DOCUMENTS

| | | | |
|---|---|---|---|
| JP | 63-200043 | A | 8/1988 |
| JP | 63-208746 | A | 8/1988 |
| JP | 63-272458 | A | 11/1988 |
| JP | 64-40267 | A | 2/1989 |
| JP | 9-137155 | A | 5/1997 |
| JP | 2987171 | B2 | 10/1999 |
| JP | 2001-3036 | A | 1/2001 |
| JP | 2002-30274 | A | 1/2002 |
| JP | 2002-110596 | A | 4/2002 |
| JP | 2002-180034 | A | 6/2002 |
| JP | 2002-241739 | A | 8/2002 |
| JP | 2002-313759 | A | 10/2002 |
| JP | 2003-31528 | A | 1/2003 |
| JP | 2004-98278 | A | 4/2004 |
| JP | 2004-323840 | A | 11/2004 |
| JP | 2005-103684 | A | 4/2005 |
| JP | 2005-120180 | A | 5/2005 |
| JP | 2005-175437 | A | 6/2005 |
| JP | 2005-217002 | A | 8/2005 |
| JP | 2005-120180 | * | 12/2005 |
| JP | 2006-128552 | A | 5/2006 |
| JP | 2006-130638 | A | 5/2006 |
| JP | 2006-193695 | A | 7/2006 |
| JP | 2006-520530 | A | 9/2006 |
| JP | 2007-88226 | A | 4/2007 |
| JP | 2007-208219 | A | 8/2007 |
| JP | 2008-063182 | A | 3/2008 |
| JP | 2008-063372 | A | 3/2008 |
| JP | 2008-074990 | A | 4/2008 |
| JP | 2008-094982 | A | 4/2008 |
| WO | WO 2008/004534 | A1 | 1/2008 |
| WO | WO 2008/005164 | A1 | 1/2008 |
| WO | WO 2008/044477 | A1 | 4/2008 |

OTHER PUBLICATIONS

Extended European Search Report dated Dec. 12, 2011, in European Patent Application No. 09762368.0.
Japanese Office Action dated Apr. 23, 2013 for Japanese Application No. 2008-152940.
Japanese Office Action dated Apr. 30, 2013 for Japanese Application No. 2008-152924.
Japanese Office Action dated Jun. 4, 2013 for Japanese Application No. 2009-127437.
Japanese Office Action, dated Jul. 16, 2013, for Patent Application No. 2008-152940.
Office Action for corresponding Japanese Patent Application No. 2008-152924, dated Oct. 3, 2012.
Office Action for corresponding Japanese Patent Application No. 2008-152940, dated Oct. 3, 2012.
Office Action for corresponding Japanese Patent Application No. 2009-127437, dated Jan. 16, 2013.
Office Action dated Jul. 18, 2012, in Japanese Patent Application No. 2008-152924.
Office Action dated Jul. 18, 2012, in Japanese Patent Application No. 2008-152940.
Office Action dated May 2, 2012, in Japanese Patent Application No. 2008-152924.
Office Action dated May 2, 2012, in Japanese Patent Application No. 2008-152940.
Office Action dated May 2, 2012, in Japanese Patent Application No. 2008-152964.

* cited by examiner

POLISHING AGENT FOR SYNTHETIC QUARTZ GLASS SUBSTRATE

CROSS-REFERENCE TO RELATED APPLICATIONS

This application is a Divisional of co-pending application Ser. No. 12/678,058 filed on Mar. 12, 2010. Application Ser. No. 12/678,058 is a National Phase of PCT International Application No. PCT/JP2009/059676 filed on May 27, 2009, which claims priority under 35 U.S.C. 119(a) to Patent Application Nos. 2008-152899 filed in Japan on Jun. 11, 2008, 2008-152924 filed in Japan on Jun. 11, 2008, 2008-152940 filed in Japan on Jun. 11, 2008 and 2008-152964 filed in Japan on Jun. 11, 2008. All of the above applications are hereby expressly incorporated by reference into the present application.

TECHNICAL FIELD

This invention relates to a polishing slurry for use with synthetic quartz glass substrates for main use in semiconductor-related electronic materials, nano-imprint-related materials, and display-related materials, especially synthetic quartz glass substrates for use in the advanced semiconductor-related electronic materials and liquid crystal-related materials.

BACKGROUND ART

Qualities of synthetic quartz glass substrates include the size and density of defects on substrates, flatness, surface roughness, photochemical stability of material, and surface chemical stability. Of these, the quality relating to defects on substrates encounters increasingly rigorous requirements in accordance with the trend of IC technology toward finer feature size processing and of display panels toward larger size.

While improvements in the defective quality of synthetic quartz glass substrates have been continuously made, the substrates used so far in the semiconductor technology, for example, are those substrates where recessed defects with a size of less than about 0.3 μm are substantially present. This is especially because a detection probability of defects with a size of up to 0.5 μm is low upon visual inspection under a collective lamp at an illuminance level causing no hygienic issue, or defect inspection by an automatic defect inspector as described in JP-A S63-200043 (Patent Document 1) and JP-A S63-208746 (Patent Document 2). This leads to a delay in the substrate quality improving approach.

Under the background, a high-sensitivity defect inspector was recently developed. Research works have progressed for controlling microscopic surface defects using this inspector. While JP-A S64-40267 (Patent Document 3) describes a process of polishing a glass substrate with colloidal silica to produce a precise mirror finish surface, this was found unsatisfactory as the microscopic defect controlling process because an analysis of surface defects by said high-sensitivity defect inspector demonstrated the presence of microscopic raised/recessed defects. In JP-A 2002-030274 (Patent Document 4), colloidal silica is described as the polishing slurry for aluminum disks and glass hard disks. It is described that the preferred $SiO_2$ concentration is in a range of 1 to 30% by mass, and Examples carry out polishing with a polishing slurry having a $SiO_2$ concentration of 10% or 14% by mass.

However, when synthetic quartz glass substrates are polished in the above-described concentration range, numerous defects with a size of up to 0.5 μm are generated. Likewise in JP 2987171 (Patent Document 5) and JP-A 2001-003036 (Patent Document 6) relating to a colloidal silica-based polishing slurry as the polishing slurry for silicon wafers, substantially the colloidal silica-based polishing slurry is diluted to a $SiO_2$ concentration of up to 10% by mass prior to use. It is then undesirable as the polishing slurry for photomask-forming glass substrates.

JP-A 2004-98278 describes that microscopic raised defects can be eliminated using high purity colloidal silica near neutrality. In fact, it is impossible to use such colloidal silica in the neutral range in a consistent manner because even those high purity products having minimal contents of metals and other impurities tend to gel or thicken or change the particle size distribution of abrasive grains with iteration of polishing.

Accordingly, such a process has a serious issue that recycling of the polishing slurry for repeated use is difficult, and inevitably the polishing slurry has to be utilized as a one-way stream, which is unfavorable in economical and environmental aspects.

Also, in the case of liquid crystal substrates, for example, further defect control is desired because photomask-forming synthetic quartz glass substrates of larger size are used as the size of liquid crystal panels increases.

SUMMARY OF INVENTION

Problem to be Solved by Invention

An object of the invention, which has been made under the circumstances, is to provide a polishing slurry for synthetic quartz glass substrates, capable of controlling the formation of defects and increasing the yield of manufacture of semiconductor devices, display panels or the like.

Means for Solving Problem

Making extensive investigations to attain the above object, the inventors have found that a polishing slurry comprising a colloidal solution such as colloidal silica and a carboxylic acid polymer, an acidic amino acid, a phenol or a glycosaminoglycan is effective for overcoming the above-discussed problems. The invention is predicated on this finding.

Specifically, the invention provides a polishing slurry for use with synthetic quartz glass substrates, as defined below.
(1) A polishing slurry for synthetic quartz glass substrates, comprising a colloidal solution and a component selected from the group consisting of a carboxylic acid polymer, an acidic amino acid, a phenol, and a glycosaminoglycan, said colloidal solution having a colloid concentration of 20 to 50% by mass.
(2) The polishing slurry for synthetic quartz glass substrates of (1) wherein the colloidal solution is a colloidal silica dispersion.
(3) The polishing slurry for synthetic quartz glass substrates of (1) or (2) wherein the carboxylic acid polymer is an acrylic acid polymer.
(4) The polishing slurry for synthetic quartz glass substrates of (1) or (2) wherein the acidic amino acid is aspartic acid or glutamic acid.
(5) The polishing slurry for synthetic quartz glass substrates of (1) or (2) wherein the phenol is catechol, resorcinol or hydroquinone.

(6) The polishing slurry for synthetic quartz glass substrates of (1) or (2) wherein the glycosaminoglycan is hyaluronic acid.
(7) The polishing slurry for synthetic quartz glass substrates of any one of (1) to (6), having pH 9 to 10.5.
(8) The polishing slurry for synthetic quartz glass substrates of (7) wherein the pH is adjusted with one or more selected from the group consisting of an alkali metal hydroxide, alkaline earth metal hydroxide, basic salt, amine, and ammonia.
(9) The polishing slurry for synthetic quartz glass substrates of any one of (1) to (8) wherein the synthetic quartz glass substrate is a photomask-forming synthetic quartz substrate.

Advantageous Effects of Invention

In the manufacture of synthetic quartz glass such as synthetic quartz glass substrates for forming photomasks to be used in the photolithography that is important in the manufacture of IC or the like, according to the invention, the formation of defects on the surface of synthetic quartz glass substrates which are detectable by the high-sensitivity defect inspector is inhibited, an increase in the yield of manufacture of semiconductor devices or the like is expectable, and a further reduction of feature size in the semiconductor industry is achievable.

Also, for photomask-forming synthetic quartz glass substrates with end faces having a certain thickness used in display-related materials, the invention inhibits the formation of defects during polishing and improves the yield of manufacture.

DESCRIPTION OF EMBODIMENTS

The polishing slurry for synthetic quartz glass substrates according to the invention comprises a colloidal solution and one or more components selected from among carboxylic acid polymers, acidic amino acids, phenols, and glycosaminoglycans.

The colloidal solution used herein preferably contains colloidal particles of a fine particle size, and specifically a primary particle size of preferably 5 to 500 nm, more preferably 10 to 200 nm, and most preferably 20 to 150 nm. With too small a particle size, colloidal particles tend to attach or adhere to the substrate surface, interfering with cleaning. Particles with too large a particle size may permit a substrate as polished to have a poor surface roughness and be undesirable as the polishing slurry for final precision polishing. It is noted that the particle size is a measurement by the dynamic light scattering method.

The colloidal solution has a concentration of 20 to 50% by mass, and preferably 35 to 45% by mass. With a concentration of less than 20% by mass, microscopic flaws are formed on the glass surface. With a concentration of more than 50% by mass, the polishing slurry becomes unstable and increases its viscosity to inhibit polishing.

The particle size distribution may be either monodisperse or polydisperse or have a plurality of particle size peaks.

Types of colloidal particles include colloidal silica, colloidal ceria, and colloidal zirconia, with colloidal silica being most preferred.

With respect to the particle shape, colloidal silicas dispersed in various colloidal forms including spherical, cocoon, and coupled forms are available, with the colloidal silica in spherical form being preferred.

Colloidal silicas include those from various preparation methods, for example, those granulated from water glass, and those obtained from hydrolysis of organic silicate compounds such as alkoxysilanes. Many dispersing media generally have alkaline pH from the standpoint of storage stability although neutral or acidic pH may be acceptable. Preferred are pH values in the range of 3 to 5 or in the range of 8 to 11. More preferred are pH values in the range of 9 to 10.5. At pH near neutrality, the polishing slurry may tend to be unstable. At too strong alkalinity, surface roughness may occur on the glass as polished.

Further, while silica abrasive grains are generally used as dispersed in water, they may also be dispersed in an organic solvent such as methanol, isopropanol, ethylene glycol, methyl ethyl ketone, toluene, or xylene or a mixture thereof. Moreover, of these organic solvents and mixtures thereof, water-soluble ones may be mixed with water in any desired proportion.

As the colloidal silica dispersion liquid, commercially available products may be used, for example, COMPOL-50, COMPOL-80, COMPOL-120 and COMPOL-EX111 from Fujimi Inc., ST-XL, ST-YL, and ST-ZL from Nissan Chemical Industries, Ltd., SYTON from Dupont, NALCO series from Nitta Haas Inc., and GP series from Fuso Chemical Co., Ltd.

When the dispersion or polishing slurry is used to polish glass substrates, one or multiple components selected from among carboxylic acid polymers, acidic amino acids, phenols, and glycosaminoglycans are added to the polishing slurry, thereby reducing the number of defects which are detectable by the high-sensitivity defect inspector.

The inventors made investigations on the defect forming mechanism based on the following hypothesis.

With respect to abrasive grains in the polishing slurry, condensation occurs between grain surfaces due to the work by polishing action, or condensation occurs between glass swarf removed from the surface being polished and abrasive grains, to create active particles which can cause defects, which then condense or attach to the surface, end face or chamfered edge under the polishing action, or form flaws on the surface. It is thus recognized that the stability of abrasive grains in the polishing slurry is important.

Also, since end faces or chamfered edges of a synthetic quartz glass substrate for a large-size photomask for use in the display application have not been mirror finished as opposed to the front and rear surfaces thereof, the tendency that the polishing slurry adheres thereto as dry deposits during the polishing operation becomes stronger as the substrate becomes thicker.

In general, for substrate polishing, either double-side or single-side polishing may be employed. The time required for the polishing of a large-size synthetic quartz glass substrate is at least several tens of minutes, and sometimes ten or more hours. While the surface to be polished is always kept in contact with the polishing slurry and thus wetted, the end face and chamfered edge in the case of double-side polishing or the end face, chamfered edge and rear surface in the case of single-side polishing become surfaces not subject to polishing where adhesion and drying of the polishing slurry continue intermittently over a long time. As adhesion of the polishing slurry continues for a long time on the front and rear surfaces being polished and intermittent adhesion and drying of the polishing slurry occur on those surfaces not subject to polishing, solid deposits form which are not readily scraped off. Such solid deposits are not completely removed during the cleaning step following polishing, and if spalled off, they cause surface defects, or if carried from the end face to the front surface during cleaning, they become dry stains (or flow stains). These phenomena arise from the specialty of polishing of large-size synthetic quartz glass substrates because they are not regarded problematic with conventional semiconductor-related substrates wherein the polishing time is generally as short as several tens of minutes, and about one hour at the longest, and the substrate is always kept wet in contact with the polishing slurry during the polishing step. It is then recognized that on the surface not subject to polishing, the ease of removal of the polishing slurry after condensation or dry attachment is also important.

In the polishing method using high purity colloidal silica in the neutral region as described in the above-referred JP-A 2004-98278, for example, the adhesion of grains on the glass surface in chemical reaction mode may be restrained because of a weak electric repulsive force between grains due to a low zeta-potential on grain surfaces as compared with alkaline colloidal silica in the stable region around pH 10. However, since abrasive grains condense together due to mechanical action of polishing, a sudden gelation or viscosity buildup is observed. Thus the method cannot be used in practice. Even when the polishing pressure is moderated so as to minimize instability, the particle size distribution is shifted to a higher size by the work of shear forces of the polishing plate, causing flaws on the surface.

In the above situation, when a carboxylic acid polymer is added to the polishing slurry, a protective colloid action may be induced or abrasive grains be taken in the network structure of polymeric sol-gel. It is then possible to inhibit mutual approach and condensation of abrasive grains in the polishing slurry and also to inhibit particles formed by condensation of abrasive grains from condensing or adhering to the as-polished glass substrate surface or colliding against the surface to form flaws.

Preferred types of the carboxylic acid polymer include acrylic acid polymers, maleic acid polymers, and phthalic acid polymers. The concentration of carboxylic acid polymer is preferably 0.001 to 1.0% by mass, and more preferably 0.01 to 0.5% by mass based on the solids in the colloidal solution, specifically the mass of silica. Too low a concentration may fail to achieve an effect sufficient to inhibit flaws whereas too high a concentration may obstruct a stable supply of the polishing slurry to the polisher because of a high viscosity of the high molecular polymer. The carboxylic acid polymer preferably has a weight average molecular weight of 1,000 to 100,000,000, and more preferably 10,000 to 10,000,000. Too low a molecular weight may fail to achieve an effect sufficient to inhibit flaws whereas too high a molecular weight may obstruct a stable supply of the polishing slurry to the polisher because of a high viscosity.

It is noted that the weight average molecular weight is as measured by gel permeation chromatography (GPC) versus polystyrene standards.

Exemplary water-soluble polymers other than the carboxylic acid polymers include cellulose derivatives, polyvinyl alcohol, polyvinylpyrrolidone, and polyacrylamide. These water-soluble polymers are expected to exert some effects on the condensation and adhesion of grains and the formation of flaws. Nevertheless, the carboxylic acid polymers are most effective because negatively charged carboxyl ions are repulsive to each other to facilitate spreading of the network so that abrasive grains may be effectively taken therein, and are also repulsive to the glass substrate surface which is a negatively charged object to be polished.

Of the abrasive grains which are readily taken in the network, electrically charged colloidal particles are preferred. The size of the abrasive grains which are readily taken in the network is preferably 5 to 500 nm, more preferably 10 to 200 nm, and most preferably 20 to 150 nm.

Also, when an acidic amino acid is added to the polishing slurry, the electrical stability of the colloidal silica polishing slurry can be increased. The acidic amino acid having a relatively low isoelectric point among amino acids has a greater negative surface charge in a basic solution of higher pH and functions to inhibit mutual approach and condensation of abrasive grains in the polishing slurry, and also to inhibit particles formed by condensation of abrasive grains from condensing or adhering to the as-polished glass substrate surface or colliding against the surface to form flaws.

Preferred types of the acidic amino acid are aspartic acid and glutamic acid. The concentration of acidic amino acid is preferably 0.05 to 10.0% by mass, and more preferably 0.5 to 3.0% by mass based on the solids in the colloidal solution, specifically the mass of silica. Too low a concentration may fail to achieve an effect sufficient to inhibit flaws whereas too high a concentration may lead to a polishing slurry having a higher ion concentration which is susceptible to salting-out of colloid and rather becomes unstable.

Exemplary amino acids other than the acidic amino acid include asparagine, serine, threonine, lysine, etc. These amino acids are expected to exert some effects on the condensation and adhesion of grains and the formation of flaws. Nevertheless, the acidic amino acid is most effective because the acidic amino acid is highly negatively charged in a basic solution and is repulsive to the negatively charged abrasive grains and glass substrate surface which is an object to be polished.

It is also effective to add a phenol to the polishing slurry. It is known that the phenol is present in the form of phenolate in an aqueous solution as it dissociates into proton and phenolate. Negatively charged phenolate can enhance the electrical stability of the colloidal silica polishing slurry. Specifically, negatively charged phenolate functions to inhibit mutual approach and condensation of abrasive grains in the polishing slurry, and also to inhibit particles formed by condensation of abrasive grains from condensing or adhering to the as-polished glass substrate surface or colliding against the surface to form flaws.

Preferred types of the phenol include phenol, cresol, xylenol, naphthol, catechol, resorcinol, hydroquinone, pyrogallol, phloroglucinol and salts thereof. Inter alia, catechol, resorcinol, and hydroquinone are preferred from the standpoints of solubility in aqueous medium polishing slurry and electric charge. The concentration of the phenol is preferably 0.05 to 10.0% by mass, and more preferably 0.5 to 3.0% by mass based on the solids in the colloidal solution, specifically the mass of silica. Too low a concentration may fail to achieve an effect sufficient to inhibit flaws whereas at too high a concentration, the phenol may not be thoroughly dissolved.

Although alcohols such as methanol and ethanol are compounds similar to the phenol, the alcohol which is not ionized in solution due to a low acidity does not contribute to electrical stability as does the phenol.

Further, when a glycosaminoglycan is added to the polishing slurry, the electrical stability of the colloidal silica polishing slurry can be increased due to its physical property of strong negative charges and abrasive grains be taken in the network structure of polymeric sol-gel. It is then possible to inhibit mutual approach and condensation of abrasive grains in the polishing slurry, and also to inhibit particles formed by condensation of abrasive grains from condensing or adhering to the as-polished glass substrate surface or colliding against the surface to form flaws.

Preferred types of the glycosaminoglycan include hyaluronic acid, heparan sulfate, chondroitin sulfate, keratan sulfate and salts thereof. The concentration of glycosaminoglycan is preferably 0.001 to 1.0% by mass, and more preferably 0.01 to 0.5% by mass based on the solids in the colloidal solution, specifically the mass of silica. Too low a concentration may fail to achieve an effect sufficient to inhibit flaws whereas too high a concentration may obstruct a stable supply of the polishing slurry to the polisher because of a high viscosity of glycosaminoglycan.

The glycosaminoglycan preferably has a weight average molecular weight of 1,000 to 100,000,000, and more preferably 10,000 to 10,000,000. Too low a molecular weight may fail to achieve an effect sufficient to inhibit flaws whereas too high a molecular weight may obstruct a stable supply of the polishing slurry to the polisher because of a high viscosity.

It is noted that the weight average molecular weight is as measured by gel permeation chromatography (GPC) versus polystyrene standards.

Exemplary water-soluble polymers other than the glycosaminoglycan include cellulose derivatives, polyvinyl alcohol, polyvinylpyrrolidone, and polyacrylamide. These water-soluble polymers are expected to exert some effects on the condensation and adhesion of grains and the formation of flaws. Nevertheless, the glycosaminoglycan is most effective because negatively charged carboxyl and sulfate groups are repulsive to each other to facilitate spreading of the network so that abrasive grains may be effectively taken therein, and are also repulsive to the glass substrate surface which is a negatively charged object to be polished. It is further expectable that the glycosaminoglycan has so strong a water-retaining action that it may also be effective in preventing drying and adhesion of the polishing slurry on the substrate surface when a glass substrate is taken out of the polisher after the completion of polishing.

It is noted that in addition to the above-illustrated additives, other additives such as pH modifiers, buffer agents and rust preventives may be added. In particular, pH adjustment of the polishing slurry is important in controlling microscopic defects. It is thus desirable to add a pH modifier in order to provide pH in the range of 9 to 10.5.

Suitable pH modifiers which can be used herein include alkali metal hydroxides, alkaline earth metal hydroxides, basic salts, amines, and ammonia. Examples include potassium hydroxide, sodium hydroxide, calcium hydroxide, sodium borate, monoethanolamine, diethanolamine, triethanolamine, and ethylenediamine. The additives exemplified above may be used alone or in combination of two or more. Inter alia, diethanolamine or triethanolamine is preferred.

The pH modifier is preferably added in such an amount as to provide pH in the range of 9 to 10.5. Since it is important that the pH of the polishing slurry does not deviate from this range during polishing, the sequence of adding other additives in advance and adding the pH modifier later is preferred. If the pH of the polishing slurry varies during polishing, the pH modifier may be added at an appropriate point of time so as to provide pH 9 to 10.5. In the case of strong bases having a high dissociation constant like alkali metal hydroxides, pH adjustment is difficult because in the relevant pH range, even a small difference in addition amount may result in a substantial variation of pH. In this regard, diethanolamine and triethanolamine which are bases of moderate strength are the preferred pH modifiers. At pH near neutrality, colloidal silica tends to be unstable which is inconvenient to continuous polishing. At too high pH, surface roughening may occur on the as-polished quartz glass.

Additives other than the pH modifier which can be used herein include carboxylic acids and salts thereof. Specifically, carboxylic acids of chain structure having a molecular weight of at least 100 and aromatic carboxylic acids are preferred. Examples include methacrylic acid, succinic acid, maleic acid, fumaric acid, tartaric acid, malic acid, adipic acid, citric acid, benzoic acid, methylbenzoic acid, t-butylbenzoic acid, salicylic acid, phthalic acid, isophthalic acid, terephthalic acid, phenylacetic acid, and salts thereof. The additives exemplified above may be used alone or in combination of two or more. Since these molecules are water soluble and bulky, they have the advantage that when added to the polishing slurry, the molecules coordinate with colloidal particles to stabilize the colloidal state.

The synthetic quartz glass substrate to be polished herein is obtained from a synthetic quartz glass ingot through steps of shaping, annealing, slicing, lapping and rough-polishing. This is followed by a precision polishing step dictating the final surface quality where the substrate is polished using the polishing slurry for synthetic quartz glass substrates of the invention.

It is noted that the polishing mode using the polishing slurry of the invention is typically batchwise double-side polishing although single-side polishing and single-wafer polishing may also be acceptable.

The synthetic quartz glass substrate which is polished using the polishing slurry of the invention may be used in the fields of semiconductor-related electronic materials and liquid crystals, and especially as photomasks.

For example, semiconductor-related substrates are dimensioned 152 mm by 152 mm by about 6.35 mm thick. In the case of nano-imprint substrates, since the nano-imprint technology is adapted to manufacture a small number of many different products, substrates of various sizes may be contemplated, including those of 152 mm by 152 mm by about 6.35 mm thick like the semiconductor substrates, those of 65 mm by 65 mm by about 6.35 mm thick, and wafer substrates having a diameter of 150 mm and a thickness of 0.5 to 1.0 mm.

On the other hand, in the case of liquid crystal-related materials, substrates include those of 330 mm by 450 mm by 5 mm thick, those of 800 mm by 920 mm by 8 mm or 10 mm thick, those of 1220 mm by 1400 mm by 13 mm thick, and those of 1600 to 1800 mm by 1700 to 1900 mm by 16 to 20 mm thick.

EXAMPLE

Examples and Comparative Examples are given below for illustrating the invention, but the invention is not limited thereto. In Examples, the particle size is as measured by the dynamic light scattering method.

Example 1

A silica synthetic quartz glass substrate stock as sliced (6 inches) was lapped, after which rough-polishing and final precision polishing were carried out by a double-side polisher. A soft suede-type polishing pad was used and a polishing slurry was used comprising a colloidal silica water dispersion having a $SiO_2$ concentration of 40% by mass (Fujimi Inc., primary particle size 78 nm) to which 0.5% by mass of sodium polyacrylate (weight average molecular weight 250,000-700,000, Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm).

The polishing was followed by cleaning and drying, after which defect inspection was carried out using a laser conforcal optical system high-sensitivity defect inspector (Lasertec Corp.). The number of defects with a size of at least 0.15 μm was 4.0 on the average.

Example 2

Defect inspection was done as in Example 1 except that sodium polymaleate (weight average molecular weight 1,000, Toa Gosei Co., Ltd.) was used instead of the sodium polyacrylate in Example 1. The number of defects was 7.1 on the average.

Example 3

Defect inspection was done as in Example 1 except that an acrylic acid/maleic acid copolymer (weight average molecular weight 60,000, Nippon Shokubai Co., Ltd.) was used instead of the sodium polyacrylate in Example 1. The number of defects was 4.4 on the average.

Example 4

Defect inspection was done as in Example 1 except that 0.5% by mass of sodium polyacrylate (weight average molecular weight 20,000-700,000, Wako Pure Chemical Industries Ltd.) and 0.5% by mass of benzoic acid were used instead of the sodium polyacrylate in Example 1. The number of defects was 3.2 on the average.

Example 5

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added (the addition of sodium polyacrylate resulted in polishing slurry at pH 7.6). Polishing was done under a load of 100 gf while the polishing allowance was an amount sufficient to remove the flaws introduced in the rough-polishing step (at least about 1 μm).

Defect inspection was done as in Example 1, finding that the number of defects was 4.3 on the average.

Example 6

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm).

Defect inspection was done as in Example 1, finding that the number of defects was 2.3 on the average.

Example 7

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm). Polishing was continued just until the polishing pad was worn out.

Defect inspection was done as in Example 1, finding that the number of defects was 3.3 on the average for those substrates polished in the initial stage and 3.5 on the average for those substrates polished in the last stage.

Example 8

A silica synthetic quartz glass substrate stock as sliced (1220 mm □ 1400 mm □ 13 mm thick) was lapped and rough-polished by a single-side polisher, after which it was subjected to final precision polishing by a double-side polisher. At this point, the end face of the substrate had a surface roughness (Ra) of 0.2 μm.

A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added and diethanolamine was added to adjust to pH 10.0. Polishing was done under a load of 70.0 gf for 4 hours while the polishing allowance was an amount sufficient to remove the flaws introduced in the rough-polishing step (at least about 3 μm).

The polishing was followed by cleaning and drying, after which defect inspection was carried out using a light scattering defect inspector (Lasertec Corp.). No stains flowing away from the end face were observed, and the number of defects with a size of at least 0.3 μm was 0.5/100 $cm^2$ on the average.

Example 9

Defect inspection was done as in Example 8 except that sodium polymaleate (weight average molecular weight 1,000, Toa Gosei Co., Ltd.) was used instead of the sodium polyacrylate in Example 8. No stains flowing away from the end face were observed, and the number of defects with a size of at least 0.3 μm was 0.8/100 $cm^2$ on the average.

Example 10

Defect inspection was done as in Example 8 except that an acrylic acid/maleic acid copolymer (weight average molecular weight 60,000, Nippon Shokubai Co., Ltd.) was used instead of the sodium polyacrylate in Example 8. No stains flowing away from the end face were observed, and the number of defects with a size of at least 0.3 µm was 0.7/100 cm$^2$ on the average.

Example 11

Defect inspection was done as in Example 8 except that 0.5% by mass of sodium polyacrylate (weight average molecular weight 20,000-700,000, Wako Pure Chemical Industries Ltd.) and 0.5% by mass of benzoic acid were used instead of the sodium polyacrylate in Example 8. No stains flowing away from the end face were observed, and the number of defects with a size of at least 0.3 µm was 0.4/100 cm$^2$ on the average.

Example 12

A silica synthetic quartz glass substrate stock as sliced (1600 mm □ 1700 mm □ 18 mm thick) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added (the addition of sodium polyacrylate resulted in polishing slurry at pH 7.6). Polishing was done under a load of 70.0 gf while the polishing allowance was an amount sufficient to remove the flaws introduced in the rough-polishing step (at least about 3 µm).

On defect inspection as in Example 8, no stains flowing away from the end face were observed, and the number of defects with a size of at least 0.3 µm was 0.5/100 cm$^2$ on the average.

Example 13

The procedure was the same as in Example 12 except that a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added and diethanolamine was added to adjust to pH 10.0, the polishing load was 70.0 gf, and the polishing allowance was an amount sufficient to remove the flaws introduced in the rough-polishing step (at least about 3 µm).

On defect inspection as in Example 8, no stains flowing away from the end face were observed, and the number of defects with a size of at least 0.3 µm was 0.5/100 cm$^2$ on the average.

Example 14

The procedure was the same as in Example 12 except that a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 0.5% by mass of sodium polyacrylate (weight average molecular weight 250,000-700,000, Wako Pure Chemical Industries Ltd.) was added and diethanolamine was added to adjust to pH 10.0. The polishing load was 70.0 gf, and the polishing allowance was an amount sufficient to remove the flaws introduced in the rough-polishing step (at least about 3 µm). Polishing was continued just until the polishing pad was worn out.

On defect inspection as in Example 1, no stains flowing away from the end face were observed, and the number of defects was 0.5/100 cm$^2$ on the average for those substrates polished in the initial stage and 1.2/100 cm$^2$ on the average for those substrates polished in the last stage.

Comparative Example 1

The procedure was the same as in Example 1 except that the sodium polyacrylate added to the polishing slurry used in the final polishing step in Example 1 was omitted. Defect inspection was similarly carried out using a laser conforcal optical system high-sensitivity defect inspector, finding that the number of defects was 52 on the average.

Comparative Example 2

A silica synthetic quartz glass substrate stock as sliced (6 inches) was lapped and rough-polished, after which it was subjected to final precision polishing. A soft suede-type polishing pad was used, and a polishing slurry comprising a high-purity colloidal silica water dispersion resulting from hydrolysis of alkoxysilanes and having pH 7 and a SiO$_2$ concentration of 40% by mass (Fuso Chemical Co., Ltd., primary particle size 104 nm) was used without addition of sodium polyacrylate. Polishing was done under a load of 100 gf while the polishing allowance was an amount sufficient to remove the flaws introduced in the rough-polishing step (at least about 1 µm).

As a result, the polishing slurry showed a viscosity buildup at the fourth batch from the start of polishing operation so that the polishing operation became difficult, and the polishing operation became substantially impossible at the sixth batch.

Defect inspection was carried out as in Example 1, finding that the number of defects was 10.9 on the average for those substrates polished in the initial stage and 265 on the average for those substrates polished in the last stage (sixth batch).

Comparative Example 3

The procedure was the same as in Example 8 except that the sodium polyacrylate added to the polishing slurry used in the final polishing step in Example 8 was omitted. Defect inspection was carried out using a light scattering defect inspector (Lasertec Ltd.). Stains flowing away from the end face were observed, and the number of defects with a size of at least 0.3 µm was 50/100 cm$^2$ on the average.

Comparative Example 4

A silica synthetic quartz glass substrate stock as sliced (1220 mm □ 1400 mm □ 13 mm thick) was lapped and rough-polished, after which it was subjected to final precision polishing. A soft suede-type polishing pad was used, and a polishing slurry comprising a high-purity colloidal silica water dispersion resulting from hydrolysis of alkoxysilanes and having pH 7 and a SiO$_2$ concentration of 40% by mass (Fuso Chemical Co., Ltd., primary particle size 104 nm) was used without addition of sodium polyacrylate.

Polishing was done under a load of 70.0 gf while the polishing allowance was an amount sufficient to remove the flaws introduced in the rough-polishing step (at least about 3 μm).

As a result, the polishing slurry showed a viscosity buildup at the first batch from the start of polishing operation so that the polishing operation became difficult, and the polishing operation became substantially impossible at the second batch.

Defect inspection was carried out as in Example 8. Stains flowing away from the end face were observed, and the number of defects with a size of at least 0.3 μm was 84/100 cm$^2$ on the average.

Example 15

A silica synthetic quartz glass substrate stock as sliced (6 inches) was lapped and rough-polished, after which it was subjected to final precision polishing. A soft suede-type polishing pad was used and a polishing slurry was used comprising a colloidal silica water dispersion having a SiO$_2$ concentration of 40% by mass (Fujimi Inc., primary particle size 78 nm) to which 1.0% by mass of aspartic acid (Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm).

The polishing was followed by cleaning and drying, after which defect inspection was carried out using a laser conforcal optical system high-sensitivity defect inspector (Lasertec Corp.). The number of defects was 4.7 on the average.

Example 16

Defect inspection was done as in Example 15 except that glutamic acid (Wako Pure Chemical Industries Ltd.) was used instead of the aspartic acid in Example 15. The number of defects was 4.8 on the average.

Example 17

Defect inspection was done as in Example 15 except that 1.0% by mass of aspartic acid and 0.5% by mass of benzoic acid were used instead of the aspartic acid in Example 15. The number of defects was 2.2 on the average.

Example 18

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 1.0% by mass of aspartic acid was added (the addition of aspartic acid resulted in polishing slurry at pH 4.7). Polishing was done under a load of 100 gf while the polishing allowance was an amount sufficient to remove the flaws introduced in the rough-polishing step (at least about 1 μm). Defect inspection was done as in Example 15, finding that the number of defects was 7.8 on the average.

Example 19

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 1.0% by mass of aspartic acid was added and diethanolamine was added to adjust to pH 10.0. Polishing was done under a load of 100 gf while the polishing allowance was an amount sufficient to remove the flaws introduced in the rough-polishing step (at least about 1 μm).

Defect inspection was done as in Example 15, finding that the number of defects was 2.9 on the average.

Example 20

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a SiO$_2$ concentration of 40% by mass (Fuso Chemical Co., Ltd., primary particle size 104 nm) to which 1.0% by mass of aspartic acid was added and diethanolamine was added to adjust to pH 10.0. Polishing was done under a load of 100 gf while the polishing allowance was an amount sufficient to remove the flaws introduced in the rough-polishing step (at least about 1 μm). Polishing was continued just until the polishing pad was worn out.

On defect inspection as in Example 15, the number of defects was 1.9 on the average for those substrates polished in the initial stage and 6.7 on the average for those substrates polished in the last stage.

Example 21

A silica synthetic quartz glass substrate stock as sliced (6 inches) was lapped and rough-polished, after which it was subjected to final precision polishing. A soft suede-type polishing pad was used and a polishing slurry was used comprising a colloidal silica water dispersion having a SiO$_2$ concentration of 40% by mass (Fujimi Inc., primary particle size 78 nm) to which 1.0% by mass of catechol (Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm).

The polishing was followed by cleaning and drying, after which defect inspection was carried out using a laser conforcal optical system high-sensitivity defect inspector (Lasertec Corp.). The number of defects was 5.1 on the average.

Example 22

Defect inspection was done as in Example 21 except that resorcinol (Wako Pure Chemical Industries Ltd.) was used instead of the catechol in Example 21. The number of defects was 5.8 on the average.

Example 23

Defect inspection was done as in Example 21 except that 1.0% by mass of catechol and 0.5% by mass of benzoic acid were used instead of the catechol in Example 21. The number of defects was 3.4 on the average.

Example 24

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 1.0% by mass of catechol was added (the addition of catechol resulted in polishing slurry at pH 5.9). Polishing was done under a load of 100 gf while the polishing allowance was an amount sufficient to remove the flaws introduced in the rough-polishing step (at least about 1 μm).

Defect inspection was done as in Example 21, finding that the number of defects was 7.3 on the average.

Example 25

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 1.0% by mass of catechol was added and diethanolamine was added to adjust to pH 10.0. Polishing was done under a load of 100 gf while the polishing allowance was an amount sufficient to remove the flaws introduced in the rough-polishing step (at least about 1 μm).

Defect inspection was done as in Example 21, finding that the number of defects was 2.0 on the average.

Example 26

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 1.0% by mass of catechol was added and diethanolamine was added to adjust to pH 10.0. Polishing was done under a load of 100 gf while the polishing allowance was an amount sufficient to remove the flaws introduced in the rough-polishing step (at least about 1 μm). Polishing was continued just until the polishing pad was worn out.

Defect inspection was done as in Example 21, finding that the number of defects was 2.6 on the average for those substrates polished in the initial stage and 5.2 on the average for those substrates polished in the last stage.

Example 27

A silica synthetic quartz glass substrate stock as sliced (6 inches) was lapped and rough-polished, after which it was subjected to final precision polishing. A soft suede-type polishing pad was used and a polishing slurry was used comprising a colloidal silica water dispersion having a $SiO_2$ concentration of 40% by mass (Fujimi Inc., primary particle size 78 nm) to which 0.025% by mass of sodium hyaluronate (Wako Pure Chemical Industries Ltd.) was added and diethanolamine was added to adjust to pH 10.0. Polishing was done under a load of 100 gf while the polishing allowance was an amount sufficient to remove the flaws introduced in the rough-polishing step (at least about 1 μm).

The polishing was followed by cleaning and drying, after which defect inspection was carried out using a laser conforcal optical system high-sensitivity defect inspector (Lasertec Corp.). The number of defects was 4.5 on the average.

Example 28

Defect inspection was done as in Example 27 except that chondroitin sulfate (Wako Pure Chemical Industries Ltd.) was used instead of the sodium hyaluronate in Example 27. The number of defects was 4.8 on the average.

Example 29

Defect inspection was done as in Example 27 except that 0.025% by mass of sodium hyaluronate and 0.5% by mass of benzoic acid were used instead of the sodium hyaluronate in Example 27. The number of defects was 3.0 on the average.

Example 30

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.025% by mass of sodium hyaluronate (the addition of sodium hyaluronate resulted in polishing slurry at pH 7.3). Polishing was done under a load of 100 gf while the polishing allowance was an amount sufficient to remove the flaws introduced in the rough-polishing step (at least about 1 μm).

Defect inspection was done as in Example 27, finding that the number of defects was 4.3 on the average.

Example 31

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.025% by mass of sodium hyaluronate was added and diethanolamine was added to adjust to pH 10.0. Polishing was done under a load of 100 gf while the polishing allowance was an amount sufficient to remove the flaws introduced in the rough-polishing step (at least about 1 μm).

Defect inspection was done as in Example 27, finding that the number of defects was 2.9 on the average.

Example 32

A silica synthetic quartz glass substrate stock as sliced (6 inches) was lapped and rough-polished, after which it was subjected to final precision polishing. A soft suede-type polishing pad was used and a polishing slurry was used comprising a high-purity colloidal silica water dispersion resulting from hydrolysis of alkoxysilanes and having original pH 7 and a $SiO_2$ concentration of 40% by mass (Fuso Chemical Co., Ltd., primary particle size 104 nm) to which 0.025% by mass of sodium hyaluronate was added and diethanolamine was added to adjust to pH 10.0. Polishing was done under a load of 100 gf while the polishing allowance was an amount sufficient to remove the flaws introduced in the rough-polishing step (at least about 1 μm). Polishing was continued just until the polishing pad was worn out.

Defect inspection was done as in Example 27, finding that the number of defects was 2.6 on the average for those substrates polished in the initial stage and 4.7 on the average for those substrates polished in the last stage.

Comparative Example 5

The procedure was the same as in Example 1 except that no other additives were added to the polishing slurry used in the final polishing step in Example 1. Defect inspection was similarly carried out using a laser conforcal optical system high-sensitivity defect inspector, finding that the number of defects was 52 on the average.

Comparative Example 6

A silica synthetic quartz glass substrate stock as sliced (6 inches) was lapped and rough-polished, after which it was subjected to final precision polishing. A soft suede-type polishing pad was used, and a polishing slurry comprising a high-purity colloidal silica water dispersion resulting from hydrolysis of alkoxysilanes and having pH 7 and a $SiO_2$ concentration of 40% by mass (Fuso Chemical Co., Ltd., primary particle size 104 nm) was used without addition of other additives. Polishing was done under a load of 100 gf while the polishing allowance was an amount sufficient to remove the flaws introduced in the rough-polishing step (at least about 1 μm).

As a result, the polishing slurry showed a viscosity buildup at the fourth batch from the start of polishing operation so that the polishing operation became difficult, and the polishing operation became substantially impossible at the sixth batch.

Defect inspection was carried out as in Example 1, finding that the number of defects was 10.9 on the average for those substrates polished in the initial stage and 265 on the average for those substrates polished in the last stage (sixth batch).

The invention claimed is:

1. A method of polishing a synthetic quartz glass substrate comprising:
    polishing a synthetic quartz glass substrate by a polishing slurry, wherein
    the polishing slurry comprises:
    a colloidal solution in the form of a colloidal silica water dispersion; and
    at least one component selected from the group consisting of a carboxylic acid polymer being an acrylic acid polymer having a weight average molecular weight of 1,000 to 700,000 and a phenol being resorcinol, said colloidal solution having a colloidal silica concentration of 20 to 50% by mass, and said polishing slurry having pH 9 to 10.5, and
    the polishing slurry does not contain an oxidant.

2. The method of claim 1, wherein the acrylic acid polymer has a weight average molecular weight of 20,000 to 700,000.

3. The method of claim 1, wherein the polishing slurry comprises colloidal solution having a colloidal silica concentration of 20 to 50% by mass, and
    at least one component selected from the group consisting of:
    0.5 to 1.0% by mass of a carboxylic acid polymer based on an amount of the silica in the colloidal solution; and
    0.05 to 10% by mass of a phenol based on the amount of the silica in the colloidal silica solution.

4. The method of claim 1, wherein the pH of the polishing slurry is adjusted with one or more selected from the group consisting of an alkali metal hydroxide, alkaline earth metal hydroxide, basic salt, amine, and ammonia.

5. The method of claim 1, wherein the synthetic quartz glass substrate is a photomask-forming synthetic quartz substrate.

6. The method of claim 1, wherein the polishing slurry further comprises at least one additive selected from the group consisting of pH modifiers, buffer agents, rust preventives, and carboxylic acids and salts thereof.

7. The method of claim 1, wherein the synthetic quartz glass substrate to be polished is obtained from a synthetic quartz glass ingot through steps of shaping, annealing, slicing, lapping and rough-polishing.

8. The method of claim 1, wherein the polishing is conducted as final precision polishing.

9. The method of claim 1, wherein the polishing is carried out by a double-side polisher.

10. The method of claim 1, wherein the polishing is carried out by a single-side polisher.

11. The method of claim 1, wherein the polishing is conducted by the use of a soft suede-type polishing pad.

* * * * *